US009661448B2

(12) United States Patent
Charles (10) Patent No.: US 9,661,448 B2
(45) Date of Patent: May 23, 2017

(54) METHOD FOR MANAGING INFORMATION COMMUNICATION BETWEEN A NFC CONTROLLER AND A SECURE ELEMENT WITHIN AN APPARATUS, AND CORRESPONDING APPARATUS AND NFC CONTROLLER

(71) Applicant: STMICROELECTRONICS (ROUSSET) SAS, Rousset (FR)

(72) Inventor: Alexandre Charles, Auriol (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 14/956,501

(22) Filed: Dec. 2, 2015

(65) Prior Publication Data

US 2016/0309285 A1    Oct. 20, 2016

(30) Foreign Application Priority Data

Apr. 14, 2015    (FR) ...................... 15 53229

(51) Int. Cl.
| | |
|---|---|
| H04B 5/00 | (2006.01) |
| H04W 4/00 | (2009.01) |
| H04L 9/08 | (2006.01) |
| G06K 7/10 | (2006.01) |
| H04L 12/933 | (2013.01) |

(52) U.S. Cl.
CPC ........ *H04W 4/008* (2013.01); *G06K 7/10237* (2013.01); *H04B 5/00* (2013.01); *H04B 5/0031* (2013.01); *H04L 49/102* (2013.01)

(58) Field of Classification Search
CPC .... H04W 4/008; H04W 12/00; H04L 49/102; H04L 9/00; H04L 12/40104; H04L 9/0877; H04L 9/0897; H04L 9/3234; H04B 5/0031; H04B 5/0075; H04B 1/0053; H04B 1/40
See application file for complete search history.

(56) References Cited

U.S. PATENT DOCUMENTS

| | | | |
|---|---|---|---|
| 7,374,100 B2 | 5/2008 | Jei et al. | |
| 7,471,200 B2 | 12/2008 | Otranen | |

(Continued)

FOREIGN PATENT DOCUMENTS

| | | |
|---|---|---|
| EP | 1814239 A2 | 8/2007 |
| EP | 2034428 A1 | 3/2009 |

(Continued)

*Primary Examiner* — Andrew Wendell
(74) *Attorney, Agent, or Firm* — Slater Matsil, LLP (57) ABSTRACT

A method is for managing information communication between an NFC controller coupled to an antenna for a contactless communication with an object, a device host, and a secure element. The method may include routing the information through the NFC controller, and communicating first information to be communicated between the secure element and the device host through a first communication link between the NFC controller and the device host, and through a second communication link between the NFC controller and the secure element. The method may include communicating second information with the antenna through a third communication link between the NFC controller and the secure element, the first and second communication links having bandwidths greater than a bandwidth of the third communication link.

25 Claims, 5 Drawing Sheets

(56) References Cited

U.S. PATENT DOCUMENTS

| | | | |
|---|---|---|---|
| 9,325,383 B2* | 4/2016 | Ballesteros | H04B 5/02 |
| 2006/0053244 A1 | 3/2006 | Fruhauf et al. | |
| 2007/0038854 A1 | 2/2007 | Cheon et al. | |
| 2007/0075133 A1 | 4/2007 | Yeager | |
| 2007/0108280 A1 | 5/2007 | Li et al. | |
| 2007/0263595 A1 | 11/2007 | Charrat | |
| 2008/0076475 A1 | 3/2008 | Kim | |
| 2008/0144650 A1 | 6/2008 | Boch et al. | |
| 2009/0101716 A1 | 4/2009 | Mani et al. | |
| 2010/0178868 A1 | 7/2010 | Charrat | |
| 2010/0197224 A1 | 8/2010 | Lahdenniemi et al. | |
| 2010/0210300 A1 | 8/2010 | Rizzo et al. | |
| 2011/0130095 A1 | 6/2011 | Naniyat et al. | |
| 2011/0171996 A1 | 7/2011 | Narendra et al. | |
| 2011/0226853 A1 | 9/2011 | Soh et al. | |
| 2011/0237190 A1 | 9/2011 | Jolivet | |
| 2012/0009873 A1 | 1/2012 | Corda et al. | |
| 2012/0052801 A1 | 3/2012 | Kulkarni | |
| 2012/0178365 A1 | 7/2012 | Katz et al. | |
| 2012/0178366 A1* | 7/2012 | Levy | G06K 7/10237 455/41.1 |
| 2013/0143489 A1 | 6/2013 | Morris et al. | |
| 2014/0022060 A1 | 1/2014 | Boehler et al. | |
| 2014/0156872 A1* | 6/2014 | Buer | G06F 21/76 710/8 |
| 2014/0351583 A1* | 11/2014 | Bettale | H04W 12/04 713/159 |
| 2015/0339659 A1* | 11/2015 | Ballesteros | G06Q 20/3229 705/76 |
| 2015/0348007 A1* | 12/2015 | Khan | G06Q 20/382 705/44 |
| 2016/0142109 A1* | 5/2016 | Kumar | H04W 4/008 455/41.1 |

FOREIGN PATENT DOCUMENTS

| | | |
|---|---|---|
| EP | 2221984 A1 | 8/2010 |
| EP | 2447872 A1 | 5/2012 |
| EP | 2590107 A1 | 5/2013 |
| WO | 2009147094 A1 | 12/2009 |

\* cited by examiner

METHOD FOR MANAGING INFORMATION COMMUNICATION BETWEEN A NFC CONTROLLER AND A SECURE ELEMENT WITHIN AN APPARATUS, AND CORRESPONDING APPARATUS AND NFC CONTROLLER

RELATED APPLICATION

This application claims priority to French Patent Application No. 1553229, filed Apr. 14, 2015, the entire subject matter of which is incorporated herein by reference in its entirety.

TECHNICAL FIELD

The present disclosure relates to the communication between components, in particular, between a contactless element and a device host.

BACKGROUND

Further to its normal telephone function, a mobile phone may be used for exchanging information with a contactless device by using a contactless communication protocol. This permits exchange of information between the contactless device and elements located within the mobile phone. Plenty of applications are thus possible, such as mobile ticketing in public transport (i.e. the mobile phone acts as a ticket) or mobile payment (i.e. the mobile phone acts as a debit/credit payment card).

Near Field Communication (NFC) is a short range high frequency wireless communication technology, which enables such exchanges of data between contactless devices over a short distance, for example, 10 centimeters. NFC is an open platform technology standardized in International Organization for Standardization/International Electrotechnical Commission (ISO/IEC) 18092 and ISO/IEC 21481, but incorporates a variety of pre-existing standards including ISO/IEC 14443 protocol type A and type B.

NFC device approaches generally comprise a device host, a NFC controller, and one or more secure elements. The standard way to communicate between the device host and the secure element is to use the same link, for example, a Single Wire Protocol (SWP) link, as the one used for contactless communication. However, such a link is limited in term of bandwidth. And, for some applications, a larger bandwidth may be used to allow communication between the device host and the secure element, for example, in case of transfer of data related to a fingerprint for identification of the user.

SUMMARY

Generally speaking, a method is for managing information communication between an NFC controller coupled to an antenna for a contactless communication with an object, a device host, and a secure element. The method may include routing the information through the NFC controller, and communicating first information to be communicated between the secure element and the device host through a first communication link between the NFC controller and the device host, and through a second communication link between the NFC controller and the secure element. The method may include communicating second information with the antenna through a third communication link between the NFC controller and the secure element, the first and second communication links having bandwidths greater than a bandwidth of the third communication link.

DETAILED DESCRIPTION

Generally, a method and apparatus may allow for communication between a device host and at least one secure element, which may use a large bandwidth than the one supported by the link, for example, the SWP link, used for exchanging information related to the contactless (or wireless) communication. A method is for managing information communication between a NFC controller coupled to an antenna for contactless communication with an object, to a device host and to at least one secure element. The method may comprise routing all the information through the NFC controller, communicating first information to be communicated between the at least one secure element and the device host through a first communication link between the NFC controller and the device host and through a second communication link between the NFC controller and the at least one secure element, and communicating second information coming from and/or intended to the antenna through a third communication link between the NFC controller and the at least one secure element. The first and second communication link may have bandwidths greater than the bandwidth of the third communication link.

Another link may be provided between the NFC controller and the secure element, which is different from the link used for radio frequency (RF, i.e. contactless) communication and which has a bandwidth greater than the bandwidth of the link used for the RF communication. This additional link may be used for exchanging information between the device host and the secure element with a high bit rate. Further, the disclosed approach provides a NFC controller-centric method, i.e. a method where all the information communicated between all the elements of the NFC solution pass through the NFC controller and all the routing operations of the different kinds of information are performed within the NFC controller.

According to an embodiment, the third communication link may be a SWP link. The second communication link may be a bus of the Serial Peripheral Interface (SPI) or Inter-Integrated Circuit (I2C) or universal asynchronous receiver/transmitter (UART) or universal serial bus (USB) type. The first communication link may comprise a bus of the SPI or I2C or UART type and the first information are exchanged on the first communication link by using an NFC Controller Interface (NCI) type communication protocol. The first information may comprise information exchanged by using Application Protocol Data Unit (APDU) NFC Execution Environment (NFCEE) protocol of the NCI type communication protocol.

Also, the first information may comprise information exchanged by using transparent NFCEE protocol of the NCI type communication protocol. By using such a transparent NFCEE protocol, it is thus possible to exchange either APDU, such as those compliant with the APDU NFCEE protocol, or proprietary messages compliant with a proprietary communication protocol.

Moreover, the method may further comprise communicating on the first and third communication links third information to be communicated between the at least one secure element and the device host. The third information may comprise information communicated by using Human-computer interaction (HCI) access protocol of the NCI type communication protocol.

According to another aspect, an apparatus may include an antenna for a contactless communication with an object, a device host, at least one secure element, and a NFC controller. The NFC controller may comprise first input/output means or a circuit coupled to the device host through a first communication link configured to carry first information intended to be communicated between the at least one secure element and the device host, and second input/output means or circuit coupled to the at least one secure element through a second communication link configured to carry the first information. The NFC controller may include third input/output means or circuit coupled to the at least one secure element through a third communication link configured to carry second information coming from and/or intended to the antenna, fourth input/output means or circuit coupled to the antenna, the first and second communication links having bandwidths greater than the bandwidth of the third communication link, and routing means or circuit configured to route the first information between the first and second input/output circuit and to route the second information between the third and fourth input/output circuit.

The third communication link may comprise a SWP link, and third input/output circuit may comprise an interface of the HCI type. The second communication link may comprise a bus of the SPI or I2C or UART or USB type, and the second input/output circuit may comprise a bus interface adapted to the type of the bus. The first communication link may comprise a bus of the SPI or I2C or UART type configured to support a NCI type communication protocol, and the first input/output circuit may comprise a bus interface adapted to the type of the bus.

The first and third communication links may be configured to carry third information intended to be communicated between the at least one secure element, and the device host and the routing circuit may be configured to route the third information between the first and third input/output circuits. The secure element may comprise a Universal Integrated Circuit Card (UICC) or an embedded secure element.

Figure 1:
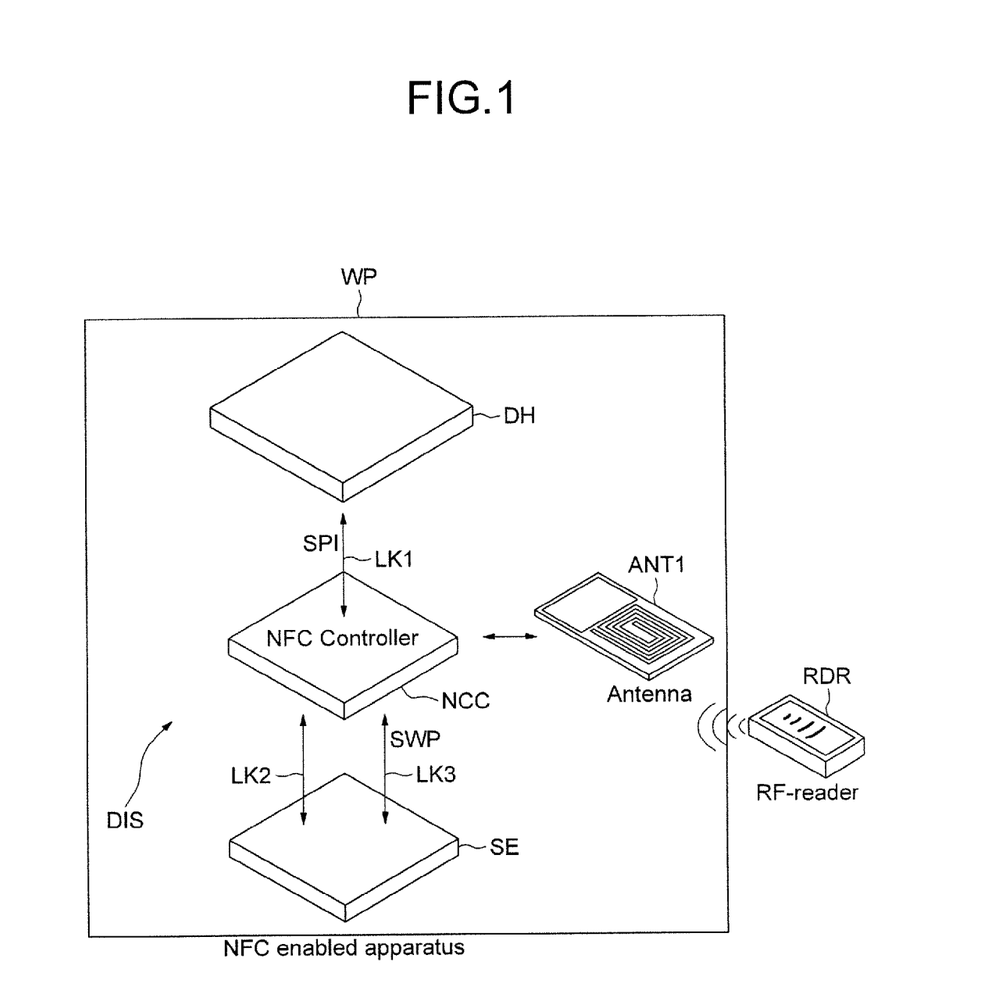
FIG. 1 is a schematic diagram of a device, according to the present disclosure.

FIG. 1 shows an NFC enabled apparatus WP, e.g. a NFC mobile phone. The apparatus WP comprises a device DIS including a contactless front end element NCC, for example, a NFC controller, which is responsible for wireless (contactless) communication, for example, RF communication, with an external RF reader RDR or an external tag or another peer NFC device through an antenna ANT1. The contactless communication protocol is, for example, the one disclosed in ISO/IEC 14443-4.

The device comprises also a secure element SE coupled to the NFC controller NCC. A secure element is, for example, an element adapted to contain secure or protected information, for example, banking information, information related to telephone subscription.

The secure element SE may be an embedded secure element, for example, a totally embedded element in an integrated circuit containing the NFC controller, and, for example, packaged (i.e. on-chip) with the NFC controller. In other words, the secure element SE may be permanently incorporated in the mobile phone, i.e. without being able to be removed.

As a variant, the secure element SE may be a removable secure element, for example, a UICC providing the network subscription (SIM and USIM application) and some RF applications using the ISO/IEC 14443-4 protocol layer in card emulation mode. As defined within European Telecommunications Standards Institute (ETSI) TR 102 216 V3.0.0 (2003-09), designates a smart card that conforms to the specifications written and maintained by the ETSI Smart Card Platform project. The mobile phone WP comprises also a device host DH responsible for managing the NFC controller as well for user input and network communication.

As illustrated in FIG. 1, the NFC controller NCC is coupled to the device host DH by a first communication link LK1, for example, a bus of the SPI type. The NFC controller NCC is coupled to the secure element SE by a second communication link LK2, for example, a bus of the SPI type and with a third communication link LK3, for example, a SWP link.

Although a SWP link is described here, other types of links LK3 may be used, in particular links able to carry proprietary protocols such as Digital Contactless Bridge (DCLB) or the NFC Wire Interface (NFC-WI) interface. The bandwidths of all this types of links or interfaces are defined up to few megabits per second. (e.g. SWP up to 1.7 Mbps, DCLB up to 848 kbps, WI up to 848 kbps). The first and second communication links LK1 and LK2 are chosen to have a bandwidth greater than the bandwidth of the third communication link LK3. Buses of the SPI, or I2C, or UART, or USB type are examples of such a link. And, the bandwidth of such a link may be up to 26 Mbps.

The coupling between the device host DH, the NFC controller NCC and the secure element will now be described in more detail with reference to FIG. 2. The NFC controller NCC comprises a first input/output circuit IO1 coupled to the device of DH through the first communication link LK1, a second input/output circuit IO2 coupled to the secure element SE through the second communication circuit LK2, a third input/output circuit IO3 coupled to the secure element SE through the third communication link LK3, and a fourth input/output circuit IO4 coupled to the antenna ANT1. It should be noted here that the bandwidth of a link is also the bandwidth of the input/output circuit coupled to that link.

As indicated above, the third communication link LK3 is a SWP link. A SWP link is a link or line adapted to support the SWP. The SWP is a bit oriented, point-to-point communication protocol between a secure element and a contactless front end, and is specified in the standard ETSI TS 102 613, for example, the version V7.7.0 (2009-10) thereof. The skilled person could refer if necessary to this document.

Figure 3:
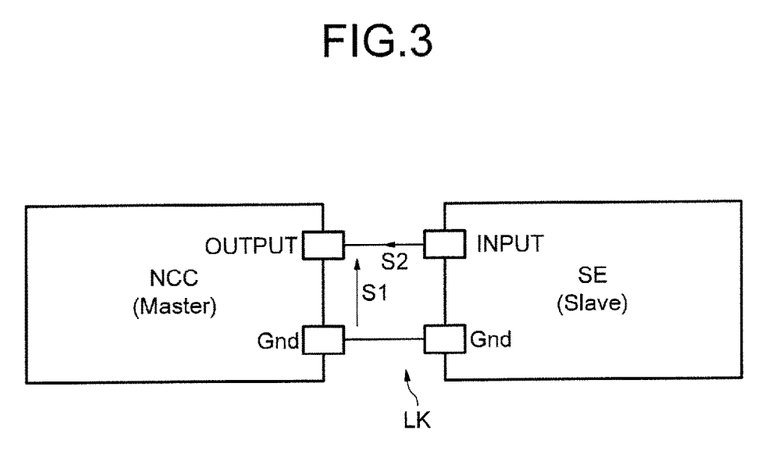
FIG. 3 is a schematic diagram of an NFC controller, according to the present disclosure.

More precisely, as illustrated in FIG. 3, the NFC controller NCC is the master whereas the secure element SE is a slave. The master and a slave are mutually coupled through the SWP link LK. As disclosed in ETSI TS 102 613, the principle of the SWP is based on the transmission of digital information in full duplex mode. The signal S1 from NCC to SE is transmitted by a digital modulation (L or H) in the voltage domain whereas the signal S2 from SE to NCC is transmitted by a digital modulation (L or H) in the current domain.

When the master sends S1 as state H, then the slave may either draw a current (state H) or not (state L) and thus transmits S2. With pulse width modulation bit coding of S1, it is possible to transmit a transmission clock, as well as data in full duplex mode. More detail on this can be found in ETSI TS 102 613. The SWP link uses Host Controller Interface (HCI) as disclosed within ETSI TS 102 613 and ETSI TS 102 622. In other words, the input/output circuit 103 of the NFC controller and the corresponding input/output circuit IO30 of the secure element comprise interfaces of the HCI type.

As indicated in ETSI TS 102 622, for example, version 11.00 (2011-09), the HCI defines the interface between the NFC controller and the secure element. More specifically, the HCI has three levels: a collection of gates that exchange commands, responses and events, a Host Controller Protocol (HCP) messaging mechanism, and a HCP routing mechanism that may optionally segment messages when required. The HCP may require in particular that the underlying data link layer (e.g. SWP) shall be error-free and the order of the received/sent data shall be respected.

As explained in ETSI TS 102 613, Logical Link Control (LLC) layer is in charge of error management and flow control while Medium Access Control (MAC) layer is in charge of framing on the SWP link LK1. Among the three LC layers defined in ETSI TS 102 613, one can cite the LLC layer called Simplified High Level Data Link Control (SHDLC) LLC and the Contactless Tunneling (CLT) LLC. In fact, the SWP link LK3 uses one logical channel (or pipe) for respectively carrying data coming from and intended to the RF communication with the reader or the tag.

Turning now to the device host DH, it includes generally a processor MPR which is responsible for managing the NFC controller as well as for managing user input. The device host DH further comprises an input/output circuit IO10 coupled to the first communication link LK1. The input/output circuit IO1 of the NFC controller NCC and the input/output circuit IO10 of the device host comprise, for example, interfaces of the NFC Controller Interface (NCI) type. The communication protocol called NCI, between an NFC controller and a device host is, for example, described in the document entitled "NFC Forum-TS-NCI-1.0_candidate_1, Apr. 12, 2012". The skilled person may refer to this document if necessary.

And, the link LK1 may be, for example, a bus of the I2C, UART, or SPI type. The communication link LK2 is here a bus of the SPI type. However, such a bus may be also a bus of the I2C or UART or USB type. Accordingly, the second input/output circuit IO2 and the corresponding input/output circuit IO20 of the secure element SE comprise a bus interface corresponding to the type of the bus LK2, here a bus interface of the SPI type.

The fourth input/output circuit IO4 of the NFC controller NCC is coupled to the antenna ANT1 and is compliant with NFC protocols used for RF communication with the RF reader, the tag or another peer NFC device. The secure element SE also comprises a first processing circuit MT1 coupled to the input/output circuit IO30 for processing information related to the RF communication with the antenna ANT1, and a second processing circuit MT2 coupled to the input/output circuit IO20 for processing information exchanged on the second communication link LK2. Although the secure element SE is here an embedded secure element, it may be also a UICC. The UICC is also coupled to the NFC controller by a SWP link using Host Controller Interface (HCI) as disclosed within ETSI TS 102 613 and ETSI TS 102 622.

Figure 4:
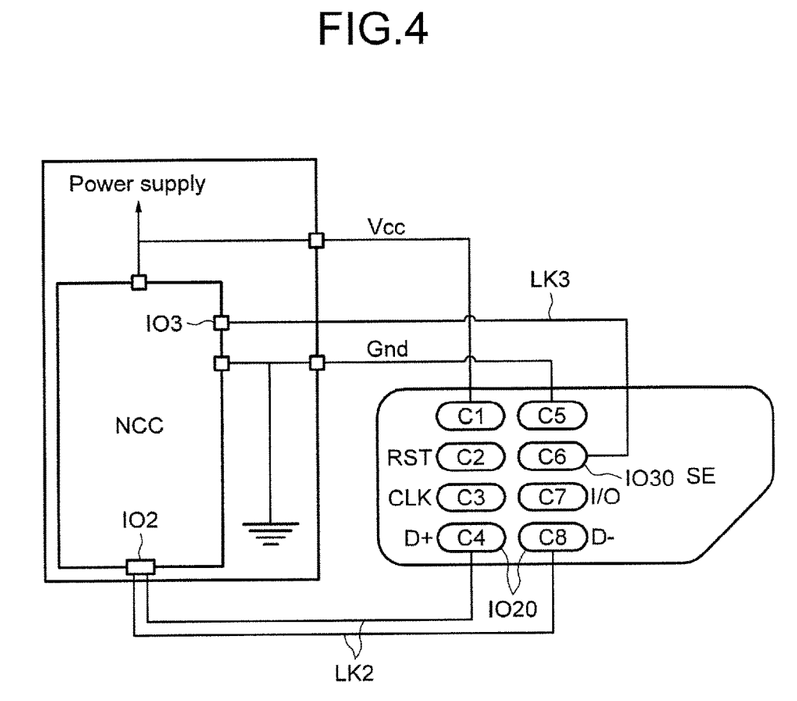
FIG. 4 is a schematic diagram of a physical link between the NFC controller and a Universal Integrated Circuit Card, according to the present disclosure.

FIG. 4 represents an embodiment of the physical link between the NFC controller NCC and a UICC. More precisely, as illustrated in this figure and explained in ETSI TS 102 613, the contact C6 (IO30) of the UICC is coupled to the port SWIO (IO3) of the NFC controller NCC for transmission of signal S1 and S2. Further, in such a case, the second communication link LK2 is an USB bus coupled between the second input/output circuit IO2 of the NFC controller NCC and the contacts C4 and C8 of the UICC form input/output circuit IO20.

Figure 2:
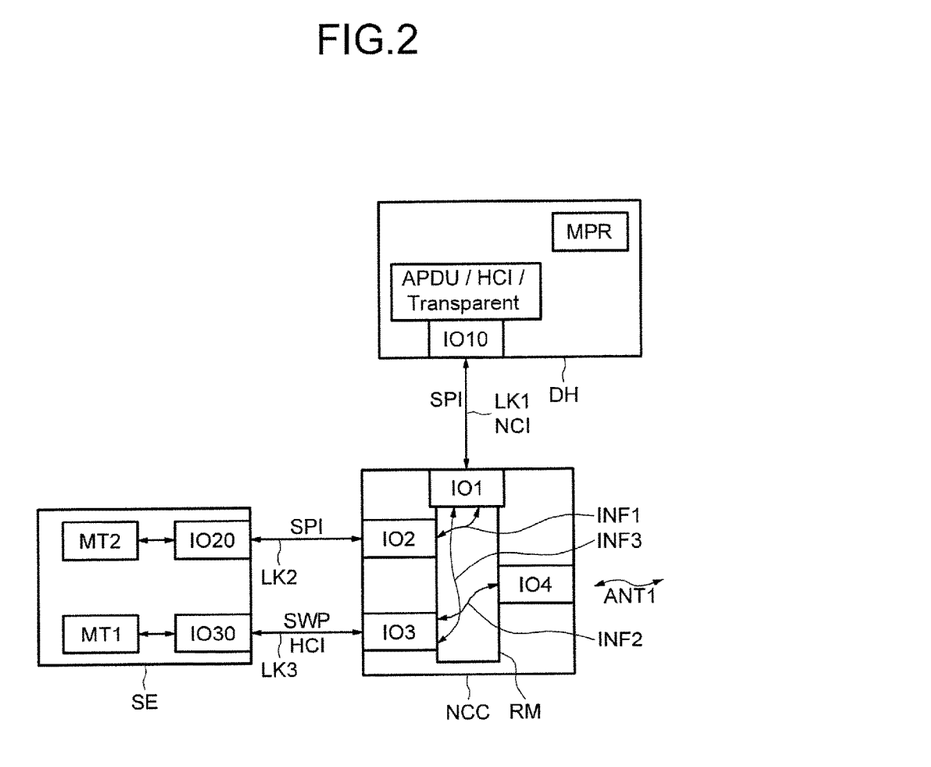
FIG. 2 is a more detailed schematic diagram of a device, according to the present disclosure.

As it can be seen in FIG. 2, all the information exchanged between the device host DH, the secure element SE and the antenna ANT1 passes through the NFC controller NFC and is routed between the corresponding input/output circuit by a routing means (e.g. a router circuit) RM which can be implemented by software module(s). More precisely, first information communicated between the secure element and the device host is communicated through the first communication link LK1 and through the second communication link LK2. Second information INF2 coming from and/or intended to the antenna ANT1 is communicated through the third communication link LK3.

More precisely, the routing circuit RM extracts the second information INF2 from the frames received at the first input/output circuit IO4 according to a NFC protocol and populates the second information INF2 according to the specification of the HCI interface IO3 in order for them to be transmitted on the SWP link LK3. Reverse processing is performed for the second information received at the HCI interface IO3 and intended to be transmitted through the fourth input/output circuit IO4.

The first information intended to be exchanged between the device host DH and the secure element SE is, for example, data related to a fingerprint, which can be encrypted or not, and which can be compared with, for example, a fingerprint reference store in the secure element in order to send back to the device host a result of this matching check.

The first information INF1 is exchanged on the first communication link LK1 by using, for example, a NCI type communication protocol. Several protocols may be used. For example, the first information may be exchanged by using the so-called APDU NFCEE protocol of the NCI type communication protocol.

The skilled person may refer to the above mentioned NCI document for having more detail about the APDU NFCEE protocol or interface. Briefly speaking, the communication used in this protocol uses the sending and receiving of APDU command response pairs. Each command APDU includes a data packet header followed by a payload containing the data field.

When the routing circuit RM receives such an APDU, it extracts the information contained therein and encapsulates it according to the transport format required by the link LK2, for example, the SPI bus. Instead of using the APDU NFCEE protocol or interface, the first information may be exchanged on the first communication link LK1 by using the transparent NFCEE protocol of the NCI communication protocol. Such transparent protocol or interface is used by the device host to communicate with the secure element coupled to the NFC controller by exchanging data, which is not understood by the NFC controller, but just passed without modification.

When the routing circuit RM of the NFC controller receives such messages, the routing circuit extracts and forwards the payload of the data messages in the appropriate message format directly to the input/output circuit IO2 without any modification. In the reverse direction, when a message from the secure element is received at the second input/output circuit, the routing circuit extracts the data from the message, populates it to the payload of a data message, and sends the data message to the device host on the first communication link LK1.

For the communication between the secure element SE and the device host DH, third information INF3 may be exchanged by using the third communication link LK3 (SWP) and the first communication link LK1. This third information INF3 is, for example, connectivity events with are events defined by HCI at the end of an RF transaction. The secure element may, for example, send to the device host an indication stating that a RF transaction is actually ended.

This third information may comprise information communicated by using HCI access protocol. And, when the routing circuit RM of the NFC controller NCC receive such third information using HCI access protocol on the first communication link LK1, it extracts the information contained thereof, encapsulates it according to the HCI protocol supported by the SWP link LK3 and routes this message on the link LK3 through the third input/output circuit IO3.

Figure 5:
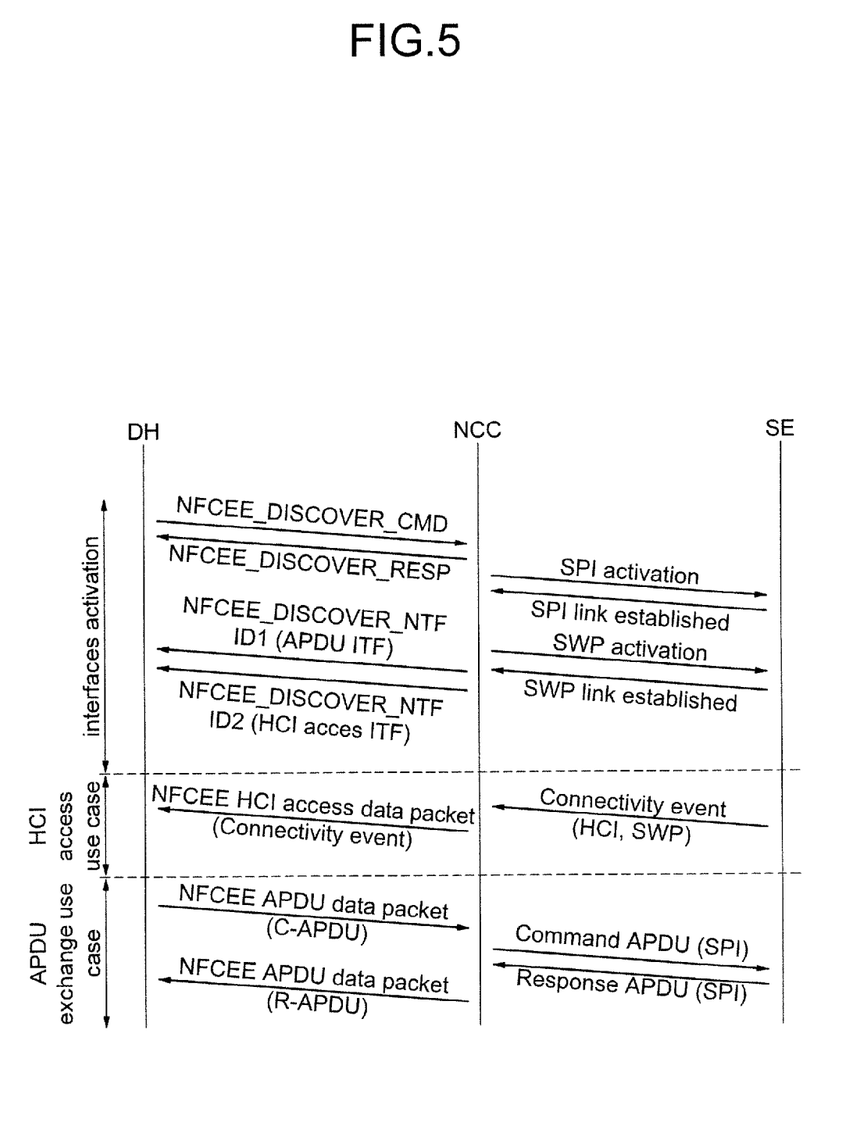
FIGS. 5 and 6 are schematic diagrams of an interface activation procedure and routing management, according to the present disclosure.

Referring now to FIG. 5, in order to activate the interfaces, a specific procedure called NFCEE discovery procedure in the above mentioned NCI document may be used. According to this procedure, the device host DH sends first a command called NFCEE_DISCOVER_CMD to the NFC controller NCC. In response to this command, the NFC controller sends a response command called NFCEE_DISCOVER_RESP. Then, the NFC controller triggers the typical activation of the SPI bus and when all is in order for the secure element, the secure element sends a response indicating that the SPI link is established.

The NFC controller triggers also the activation of the SWP link and when the activation is ended according to the SWP specification, a response indicating that the SWP link is established, is sent to the NFC controller. Then, the NFC controller sends to the device host two responses called NFCEE_DISCOVER_NTF. Each of those commands includes in the payload field an identification indication Id of the specific protocol or interface supported by the second communication link LK2 and the third communication link LK3. And, although there is only one secure element coupled to the NFC controller by two separate links LK2 and LK3, this configuration is seen by the discovery procedure as two separate secure elements supporting respectively two different interfaces.

After the interfaces have been activated, the exchange of the third information INF3 is performed according to the NFCEE HCI access protocol whereas, in this example, the first information exchanged between the secure element SE and the device host is performed by using the NFCE APDU interface. The use of two different communication links LK2 and LK3 permits sending first information INF1 and second information INF2 in parallel, for example, in an interleaved manner, without waiting, for example, the end of a RF session.

Figure 6:
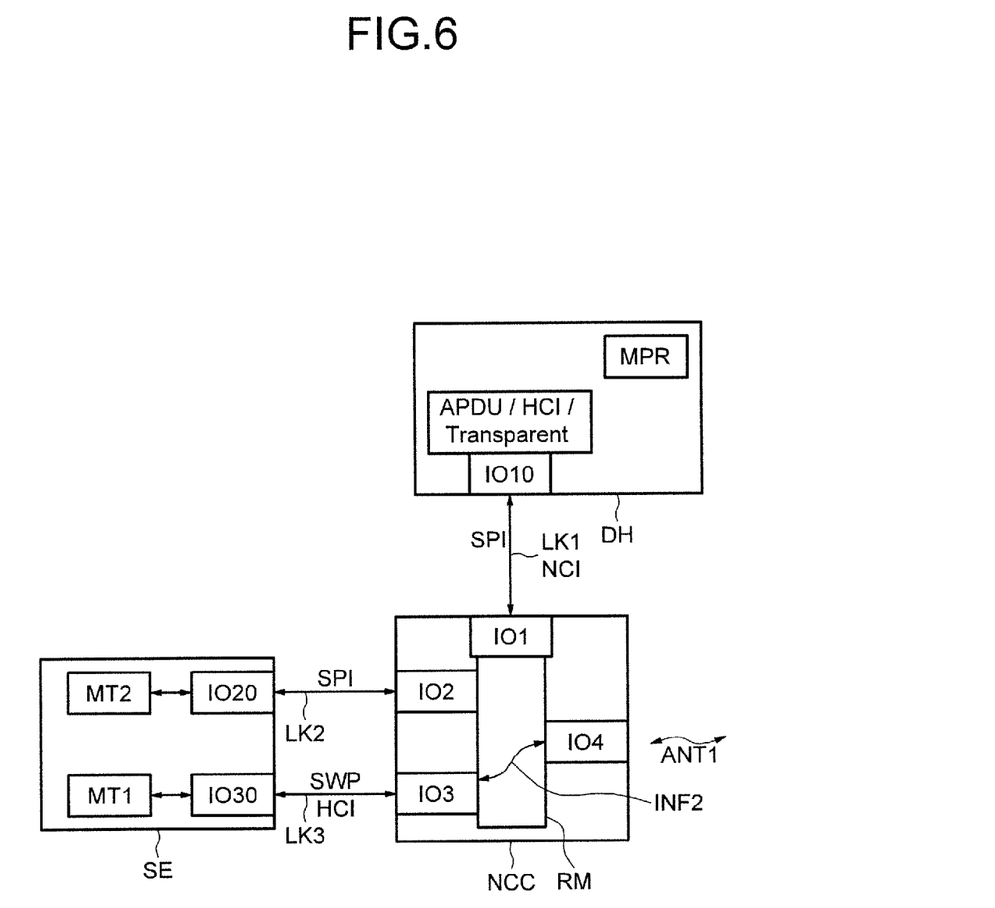

Further, as illustrated in FIG. 6, this configuration is compatible with a low power mode in which the secure element is powered by the NFC controller NCC, which is itself powered by the electromagnetic field received by the antenna ANT1 during a NFC communication with the contactless reader or tag, and not by the battery of the apparatus. And in such a low power mode, second information INF2 may be still transferred through the NFC controller and the third link LK3.

Although only one secure element SE has been described above, a plurality of secure elements (e.g. two) could be coupled to the NFC controller through a respective plurality of second links LK2 and a respective plurality of third links LK3 to input/output circuit IO2 and IO3 respectively by using, for example, multiplexers within the input/output circuit IO2 and IO3.

And during the discovery procedure, an Id for each protocol supported by each secure element will be provided to the device host. And during information exchange, the routing circuit RM of the NFC controller will route the information accordingly between the corresponding input/output circuits while controlling the multiplexer(s).

That which is claimed is:

1. A method for managing information communication among a near field communication (NFC) controller coupled to an antenna for a contactless communication with an object, a device host, and at least one secure element, the method comprising:
   routing the information through the NFC controller;
   communicating first information to be communicated between the at least one secure element and the device host through a first communication link between the NFC controller and the device host, and through a second communication link between the NFC controller and the at least one secure element; and
   communicating second information with the antenna through a third communication link between the NFC controller and the at least one secure element, the second and third communication links being separate links coupled between the NFC controller and the at least one secure element, the first and second communication links having respective bandwidths greater than a bandwidth of the third communication link.

2. The method according to claim 1 wherein the third communication link comprises a Single Wire Protocol (SWP) link.

3. The method according to claim 1 wherein the second communication link comprises at least one of a Serial Peripheral Interface (SPI) bus, an Inter-Integrated Circuit ($I^2C$) bus, a universal asynchronous receiver/transmitter (UART) bus, and a universal serial bus (USB).

4. The method according to claim 1 wherein the first communication link comprises at least one of a SPI bus, an $I^2C$ bus, and a UART bus; and wherein the first information is exchanged on the first communication link by using an NEC Controller Interface (NCI) type communication protocol.

5. The method according to claim 4 wherein the first information comprises information exchanged with a transparent Application Protocol Data Unit (APDU) NEC Execution Environment (NFCEE) protocol of the NCI type communication protocol.

6. The method according to claim 1 further comprising communicating on the first and third communication links third information to be communicated between the at least one secure element and the device host.

7. The method according to claim 6 wherein the third information comprises information communicated by using Human-computer interaction (HCI) access protocol.

8. The method according to claim 1 wherein routing comprises routing all of the information through the NFC controller.

9. A communication system comprising:
   an antenna configured to communicate contactlessly with an object;
   a device host;

at least one secure element; and a near field communication (NFC) controller comprising
a first input/output circuit coupled to said device host through a first communication link, the first communication link configured to carry first information communicated between said at least one secure element and said device host,
a second input/output circuit coupled to said at least one secure element through a second communication link configured to carry the first information,
a third input/output circuit coupled to said at least one secure element through a third communication link, the third communication link configured to carry second information with said antenna,
a fourth input/output circuit coupled to said antenna, the first and second communication links having respective bandwidths greater than a bandwidth of the third communication link, the second and third communication links being separate links coupled between said NFC controller and said at least one secure element, and
a routing circuit configured to route the first information between said first and second input/output circuits and to route the second information between said third and fourth input/output circuits.

10. The communication system according to claim 9 wherein the third communication link comprises a Single Wire Protocol (SWP) link; and wherein said third input/output circuit comprises a human-computer interaction (HCI) access protocol interface.

11. The communication system according to claim 9 wherein the second communication link comprises at least one of a Serial Peripheral Interface (SPI) bus, an Inter-Integrated Circuit (I²C) bus, a universal asynchronous receiver/transmitter (UART) bus, and a universal serial bus (USB).

12. The communication system according to claim 9 the first communication link comprises at least one of a SPI bus, an I²C bus, and a UART bus configured to support an NFC Controller Interface (NCI) type communication protocol.

13. The communication system according to claim 12 wherein the first information comprises information exchanged with a transparent Application Protocol Data Unit (APDU) NFC Execution Environment (NFCEE) protocol of the NCI type communication protocol.

14. The communication system according to claim 9 wherein the first and third communication links are configured to carry third information communicated between said at least one secure element and said device host; and wherein said routing circuit is configured to route the third information between said first and third input/output circuits.

15. The communication system according to claim 14 wherein the third information comprises information communicated by using Human-computer interaction (HCI) access protocol.

16. The communication system according to claim 9 wherein said at least one secure element comprises at least one of a Universal Integrated Circuit Card (UICC) and an embedded secure element.

17. The communication system according to claim 9 wherein said device host comprises a mobile phone.

18. A near field communication (NFC) controller comprising:
a first input/output circuit coupled to a device host through a first communication link, the first communication link configured to carry first information communicated between at least one secure element and said device host;
a second input/output circuit coupled to said at least one secure element through a second communication link configured to carry the first information;
a third input/output circuit coupled to said at least one secure element through a third communication link, the third communication link configured to carry second information with an antenna;
a fourth input/output circuit coupled to said antenna, the first and second communication links having respective bandwidths greater than a bandwidth of the third communication link, the second and third communication links being separate links coupled between said NFC controller and said at least one secure element; and
a routing circuit configured to route the first information between said first and second input/output circuits and to route the second information between said third and fourth input/output circuits.

19. The NFC controller according to claim 18 wherein the third communication link comprises a Single Wire Protocol (SWP) link; and wherein said third input/output circuit comprises a human-computer interaction (HCI) access protocol interface.

20. The NEC controller according to claim 18 wherein the second communication link comprises at least one of a Serial Peripheral Interface (SPI) bus, an Inter-Integrated Circuit (I²C) bus, a universal asynchronous receiver/transmitter (UART) bus, and a universal serial bus (USB).

21. The NFC controller according to claim 18 the first communication link comprises at least one of a SPI bus, an I²C bus, and a UART bus configured to support an NEC Controller Interface (NCI) type communication protocol.

22. The NEC controller according to claim 21 wherein the first information comprises information exchanged with a transparent Application Protocol Data Unit (APDU) NEC Execution Environment (NFCEE) protocol of the NCI type communication protocol.

23. The NEC controller according to claim 18 wherein the first and third communication links are configured to carry third information communicated between said at least one secure element and said device host; and wherein said routing circuit is configured to route the third information between said first and third input/output circuits.

24. The NFC controller according to claim 23 wherein the third information comprises information communicated by using Human-computer interaction (HCI) access protocol.

25. The NEC controller according to claim 18 wherein said at least one secure element comprises at least one of a Universal Integrated Circuit Card (UICC) and an embedded secure element.

* * * * *

UNITED STATES PATENT AND TRADEMARK OFFICE
CERTIFICATE OF CORRECTION

PATENT NO. : 9,661,448 B2
APPLICATION NO. : 14/956501
DATED : May 23, 2017
INVENTOR(S) : Alexandre Charles Page 1 of 1

It is certified that error appears in the above-identified patent and that said Letters Patent is hereby corrected as shown below:

In the Claims

In Column 8, Line 47, Claim 4, delete "NEC" and insert --NFC--.

In Column 8, Line 51, Claim 5, delete "NEC" and insert --NFC--.

In Column 10, Line 32, Claim 20, delete "NEC" and insert --NFC--.

In Column 10, Line 39, Claim 21, delete "NEC" and insert --NFC--.

In Column 10, Line 41, Claim 22, delete "NEC" and insert --NFC--.

In Column 10, Line 43, Claim 22, delete "NEC" and insert --NFC--.

In Column 10, Line 46, Claim 23, delete "NEC" and insert --NFC--.

In Column 10, Line 55, Claim 25, delete "NEC" and insert --NFC--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*